US008862152B1

(12) United States Patent
Buchholz et al.

(10) Patent No.: US 8,862,152 B1
(45) Date of Patent: Oct. 14, 2014

(54) TWO-PIECE SYSTEM AND METHOD FOR ELECTRONIC MANAGEMENT OF OFFENDERS BASED ON REAL-TIME RISK PROFILES

(71) Applicant: Alcohol Monitoring Systems, Inc., Littleton, CO (US)

(72) Inventors: Gregory A. Buchholz, Alpharetta, GA (US); Don F. Pruitt, Alpharetta, GA (US); Floyd J. Brown, Alpharetta, GA (US); Jordan B. Colletta, Alpharetta, GA (US)

(73) Assignee: Alcohol Monitoring Systems, Inc., Littleton, CO (US)

( * ) Notice: Subject to any disclaimer, the term of this patent is extended or adjusted under 35 U.S.C. 154(b) by 0 days.

(21) Appl. No.: 13/668,114

(22) Filed: Nov. 2, 2012

(51) Int. Cl.
*H04W 24/00* (2009.01)

(52) U.S. Cl.
CPC .................................... *H04W 24/00* (2013.01)
USPC ...................................................... 455/456.1

(58) Field of Classification Search
CPC ..... H04W 64/00; H04W 4/02; H04W 76/007; H04W 4/22
USPC ...................... 455/456.1–456.6, 404.1–404.2
See application file for complete search history.

(56) References Cited

U.S. PATENT DOCUMENTS 4,475,481 A 10/1984 Carroll et al.
4,649,264 A 3/1987 Carson
4,658,357 A 4/1987 Carroll et al.
4,724,427 A 2/1988 Carroll et al.
4,812,823 A 3/1989 Dickerson
4,857,893 A 8/1989 Carroll et al.
4,918,432 A 4/1990 Pauley et al.
4,952,913 A 8/1990 Pauley et al.
4,952,928 A 8/1990 Carroll et al.
5,043,736 A 8/1991 Darnell et al.
5,146,207 A 9/1992 Henry et al.
5,189,395 A 2/1993 Mitchell
5,204,670 A 4/1993 Stinton et al.
5,255,306 A 10/1993 Melton et al.
5,266,944 A 11/1993 Carroll et al.
5,298,884 A 3/1994 Gilmore et al.
5,369,699 A 11/1994 Page et al.
5,396,227 A 3/1995 Carroll et al.
5,523,740 A 6/1996 Burgmann
5,568,119 A 10/1996 Schipper et al.
5,650,766 A 7/1997 Burgmann
5,661,458 A 8/1997 Page et al.
5,731,757 A 3/1998 Layson
5,892,454 A 4/1999 Schipper et al.

(Continued)

*Primary Examiner* — Brandon Miller
(74) *Attorney, Agent, or Firm* — Sheridan Ross PC; Stanley J. Gradisar

(57) ABSTRACT

A computer-implemented method and system for monitoring an offender includes establishing a communications link between a mobile phone and an offender monitoring unit. The mobile phone may receive geocoded signals that provide indoor location information. A communications link may then be established between the mobile phone and a computer server. The geocoded signals may be relayed from the mobile phone to the computer server. The computer server may generate a correlation matrix that tracks status information associated with the offender monitoring unit and provides one or more recommendations on how to manage the offender associated with the offender monitoring unit. The offender monitoring unit may detect if it has been compromised and it may also detect a battery status signal, as well as chemical sensing signals. The offender monitoring unit may relay this status information to the mobile phone, which may then relay this information back to the computer server.

19 Claims, 11 Drawing Sheets

(56) References Cited

U.S. PATENT DOCUMENTS

| | | | | |
|---|---|---|---|---|
| 5,959,533 | A | 9/1999 | Layson et al. | |
| 5,969,600 | A | 10/1999 | Tanguay | |
| 5,982,281 | A | 11/1999 | Layson et al. | |
| 6,014,080 | A | 1/2000 | Layson et al. | |
| 6,044,257 | A | 3/2000 | Boling et al. | |
| 6,072,396 | A | 6/2000 | Gaukel et al. | |
| 6,084,517 | A | 7/2000 | Rabanne et al. | |
| 6,181,253 | B1 | 1/2001 | Eschenbach et al. | |
| 6,226,510 | B1 | 5/2001 | Boling et al. | |
| 6,260,765 | B1 | 7/2001 | Natale et al. | |
| 6,285,887 | B1 | 9/2001 | Mimura | |
| 6,366,538 | B1 | 4/2002 | Anderson et al. | |
| 6,405,213 | B1 | 6/2002 | Layson et al. | |
| 6,516,273 | B1 | 2/2003 | Pierowicz et al. | |
| 6,529,131 | B2 | 3/2003 | Wentworth | |
| 6,636,732 | B1 | 10/2003 | Boling et al. | |
| 6,639,518 | B1 | 10/2003 | Curtis | |
| 6,703,936 | B2 | 3/2004 | Hill et al. | |
| 6,774,797 | B2 | 8/2004 | Freathy et al. | |
| 6,774,799 | B2 | 8/2004 | Defant et al. | |
| 6,844,816 | B1 | 1/2005 | Melton | |
| 6,853,304 | B2 | 2/2005 | Reisman et al. | |
| 6,972,684 | B2 | 12/2005 | Copley | |
| 6,992,582 | B2 * | 1/2006 | Hill et al. | 340/539.13 |
| 6,998,985 | B2 | 2/2006 | Reisman et al. | |
| 7,015,817 | B2 | 3/2006 | Copley et al. | |
| 7,061,385 | B2 | 6/2006 | Fong et al. | |
| 7,092,695 | B1 | 8/2006 | Boling et al. | |
| 7,119,677 | B2 | 10/2006 | Ziesing | |
| 7,119,695 | B2 | 10/2006 | Defant et al. | |
| 7,123,141 | B2 | 10/2006 | Contestabile | |
| 7,205,890 | B2 | 4/2007 | Defant et al. | |
| 7,251,471 | B2 | 7/2007 | Boling et al. | |
| 7,271,717 | B1 | 9/2007 | Amos | |
| 7,319,397 | B2 | 1/2008 | Chung et al. | |
| 7,324,666 | B2 * | 1/2008 | Zoken et al. | 382/113 |
| 7,330,122 | B2 | 2/2008 | Derrick et al. | |
| 7,382,268 | B2 | 6/2008 | Hartman | |
| 7,518,500 | B2 | 4/2009 | Aninye et al. | |
| 7,535,369 | B2 | 5/2009 | Fong et al. | |
| 7,619,513 | B2 | 11/2009 | Hill et al. | |
| 7,636,047 | B1 | 12/2009 | Sempek | |
| 7,701,354 | B2 | 4/2010 | Chung | |
| 7,804,412 | B2 | 9/2010 | Derrick et al. | |
| 7,864,047 | B2 * | 1/2011 | Aninye et al. | 340/539.13 |
| RE42,671 | E * | 9/2011 | Taylor, Jr. | 340/573.4 |
| 2005/0068169 | A1 * | 3/2005 | Copley et al. | 340/539.13 |
| 2007/0023496 | A1 | 2/2007 | Hall | |
| 2007/0046258 | A1 | 3/2007 | Defant et al. | |
| 2008/0088437 | A1 | 4/2008 | Aninye et al. | |
| 2008/0088438 | A1 | 4/2008 | Aninye et al. | |
| 2008/0088521 | A1 | 4/2008 | Le et al. | |
| 2008/0174550 | A1 | 7/2008 | Laurila et al. | |
| 2008/0216561 | A1 | 9/2008 | Cooper et al. | |
| 2008/0287143 | A1 * | 11/2008 | Banks et al. | 455/456.5 |
| 2008/0316022 | A1 | 12/2008 | Buck et al. | |
| 2009/0174550 | A1 | 7/2009 | Aninye et al. | |
| 2011/0068915 | A1 * | 3/2011 | Wakefield, III | 340/539.13 |
| 2012/0094598 | A1 * | 4/2012 | Tysowski | 455/41.1 |

* cited by examiner

300

| Activity Tracked | Time 1 | Time 2 |
|---|---|---|
| Last Voice Communication | 60% | 30% |
| Last Location Tracked | 20% | 50% |
| Work History | 10% | 15% |
| Treatment | 10% | 15% |
| Current Status: | RED | YELLOW |

305, 310, 315, 320

FIG. 3

400

| COLOR CODE | RECOMMENDED ACTION: |
|---|---|
| RED | Call this offender |
| YELLOW | Send text message to the offender |
| GREEN | No action needed |

405, 410, 415

FIG. 4

TWO-PIECE SYSTEM AND METHOD FOR ELECTRONIC MANAGEMENT OF OFFENDERS BASED ON REAL-TIME RISK PROFILES

BACKGROUND

Some communities leverage electronic monitoring ("EM") systems to supplement, or even replace, traditional community supervision programs of offenders that require proactive communication with a probation officer or other government official. Because electronic monitoring systems, in many ways, provide more reliable monitoring of a participant offender than traditionally structured programs, offenders who would not normally be candidates for traditional community supervision programs can be released back into the community and effectively monitored and managed without significant risk of recidivism.

The cost of EM programs is largely attributable to initial connection rates and daily rates for monitoring an offender. There are a number of systems and methods generally available at the time of this writing for electronically monitoring offenders in a community supervision plan. For offender participants with a low risk profile, radio frequency ("RF") based systems can be cost effective. However, for those offender participants associated with a higher risk profile, global positioning system ("GPS") based technologies provide the more comprehensive functionality required to assure program compliance but usually at a significantly higher cost (at approx. five times) than traditional RF based systems.

The large gap in cost and supervision functionality between GPS and RF based systems force community supervision administrators to decline the inclusion of many offenders in a community supervision program. Though the cost of an RF based system is affordable, the minimal functionality presents ample opportunity for offender recidivism and, as such, only those offenders with the lowest risk profiles are candidates for its use.

On the other end of the spectrum, the GPS based systems offer robust monitoring, tracking and reporting functionality that is well suited for higher risk profile offenders, however, the cost of implementing a GPS system makes it overkill for medium and low risk offenders (although the functionality is desirable). To further complicate the application of current EM systems and methods, the risk profile of a typical offender is subject to change multiple times over the course of any given day.

One significant cost in EM systems may be the unit worn by the offender. If the unit supports GPS features, the hardware and software that are needed may be costly components of the system.

Therefore, there is a need in the art for a system and method that may be cost effective and appropriate for a community supervision program to monitor and track participant offenders associated with a range of profile risk levels. Further, there is a need in the art for a system and method that can be cost effective in a community supervision program to provide comprehensive and customizable reporting of historical activity data of participant offenders associated with a range of profile risk levels.

BRIEF SUMMARY

A computer-implemented method and system for monitoring an offender includes establishing a communications link between a mobile phone and an offender monitoring unit. The mobile phone may receive geocoded signals that provide indoor location information. A communications link may then be established between the mobile phone and a computer server. The geocoded signals may be relayed from the mobile phone to the computer server. The computer server may generate a correlation matrix that tracks status information associated with the offender monitoring unit and provides one or more recommendations on how to manage the offender associated with the offender monitoring unit. The offender monitoring unit may detect if it has been compromised and it may also detect a battery status signal, as well as chemical sensing signals. The offender monitoring unit may relay this status information to the mobile phone, which may then relay this information back to the computer server.

According to another exemplary aspect, an offender monitoring system and method includes a computer server for tracking and recording times and locations associated with an offender monitoring unit. A portable computing device communicates with the computer server over a wireless telephone network. The portable computing device may include a global satellite positioning module for ascertaining a geographical location of the portable computing device. The portable computing device may also include a geocode module for receiving geocoded signals that comprise location information for one or more indoor locations. The portable computing device may be associated with only a single offender monitoring unit.

Each offender monitoring unit may be coupled to the portable computing device via a wireless communication channel. Each offender monitoring unit may operate without any global satellite positioning software or hardware.

The portable computing device may include at least one of a mobile telephone, a personal digital assistant, a pager, a smartphone, a navigation device, and a hand-held computer with a wireless connection or link.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE SEVERAL VIEWS OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

FIG. 3 is a diagram of a correlation matrix which may be produced by the server of FIGS. 1A and 1D;

FIG. 4 is a diagram of a color coding system used in the correlation matrix of FIG. 3;

DETAILED DESCRIPTION

Figure 1A:
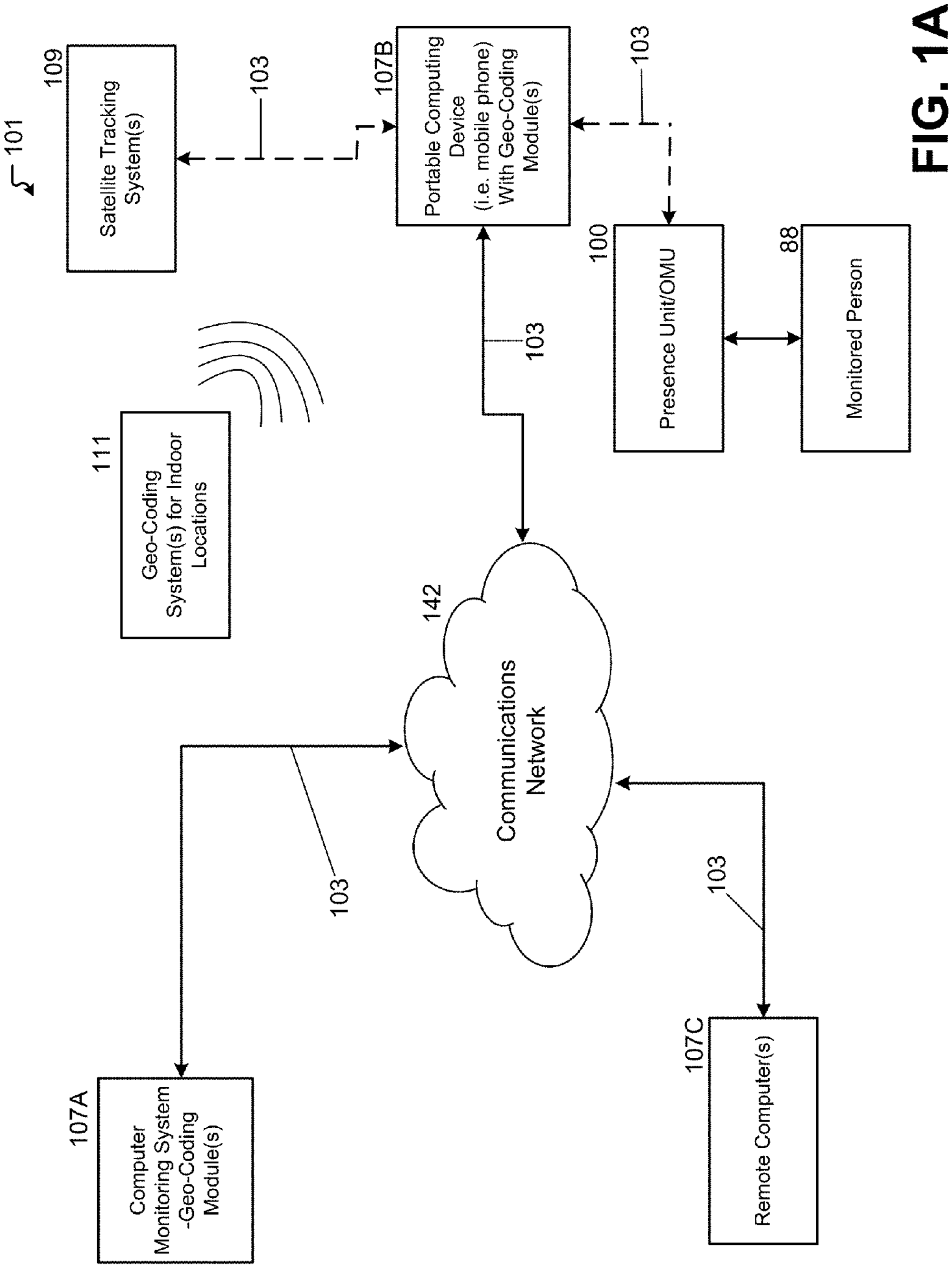
FIG. 1A illustrates a two-piece system for electronic management of offenders based on real-time risk profiles according to one exemplary embodiment.

Aspects, features and advantages of several exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms such as, for example, "will," "will not," "shall," "shall not," "must" and "must not" are not meant to limit the scope of the present invention as the embodiments disclosed herein are merely exemplary.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers.

In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet and/or a telecommunications network with other systems by way of the signal).

In this description, the term "offender management unit" ("OMU") is used to describe any device uniquely associated with an offender and operating on a limited capacity power supply, such as a rechargeable battery and/or a capacitor.

In this description, the terms "administrator" and "operator," unless specifically defined otherwise, are used interchangeably to refer to the entity in control of the various tracking and monitoring schemes implemented by the system and method. As such, the "administrator" or "operator" is envisioned to be a law enforcement agency, government authority or contracted third party.

In this description, the terms "supervision plan," "monitoring scheme," and "tracking and monitoring scheme" and "mode" are used interchangeably.

The presently disclosed embodiments, as well as features and aspects thereof, are directed towards providing a system and method for flexible and cost efficient electronic monitoring and tracking of one or more geographically dispersed offender subjects.

Certain embodiments leverage an offender management unit ("OMU") physically and uniquely associated with an offender subject. A given OMU may be multi-purposed such that it includes the requisite transceivers, associated hardware and software for communication by radio frequency ("RF"). Advantageously, a multi-purpose OMU in combination with a mobile phone or other portable computing device, which may be included in a given embodiment of the present invention, may be leveraged by a central monitoring application running on a server to monitor and track an associated offender.

One of ordinary skill in the art will recognize that the novel combination of GPS and RF functionality included with the OMU and mobile phone combination of the present system enables a range of monitoring and tracking capabilities, and thus a range of cost/benefit options, for an administrator of an EM system.

Turning now to FIG. 1A, an exemplary two-piece system 101 for electronic management of offenders based on real-time risk profiles includes an offender monitoring unit ("OMU")/presence unit 100, the offender or monitored person 88, a portable computing device 107B (i.e. such as a mobile phone), a satellite tracking system 109, a communications network 142, a computer monitoring system 107A, and one or more remote computers 107C may run various client applications for communicating with the computer system 107A. The OMU 100 may receive signals from and send signals to the portable computing device 107B, which may include a mobile phone or a tablet personal computer with a wireless connection.

Figure 1B:
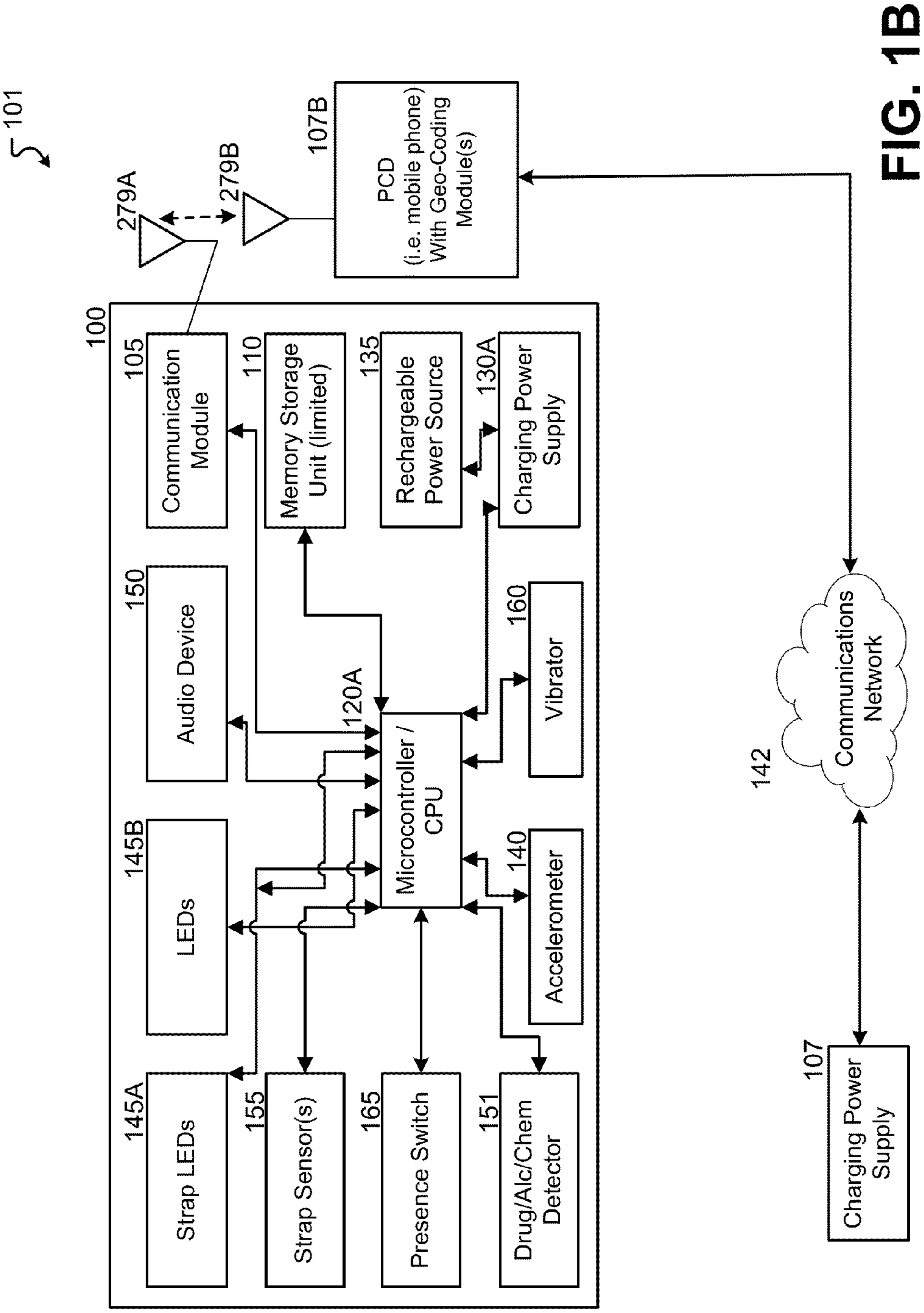
FIG. 1B is a functional block diagram of an exemplary offender monitoring unit that is part of the system illustrated in FIG. 1A.
Figure 1C:
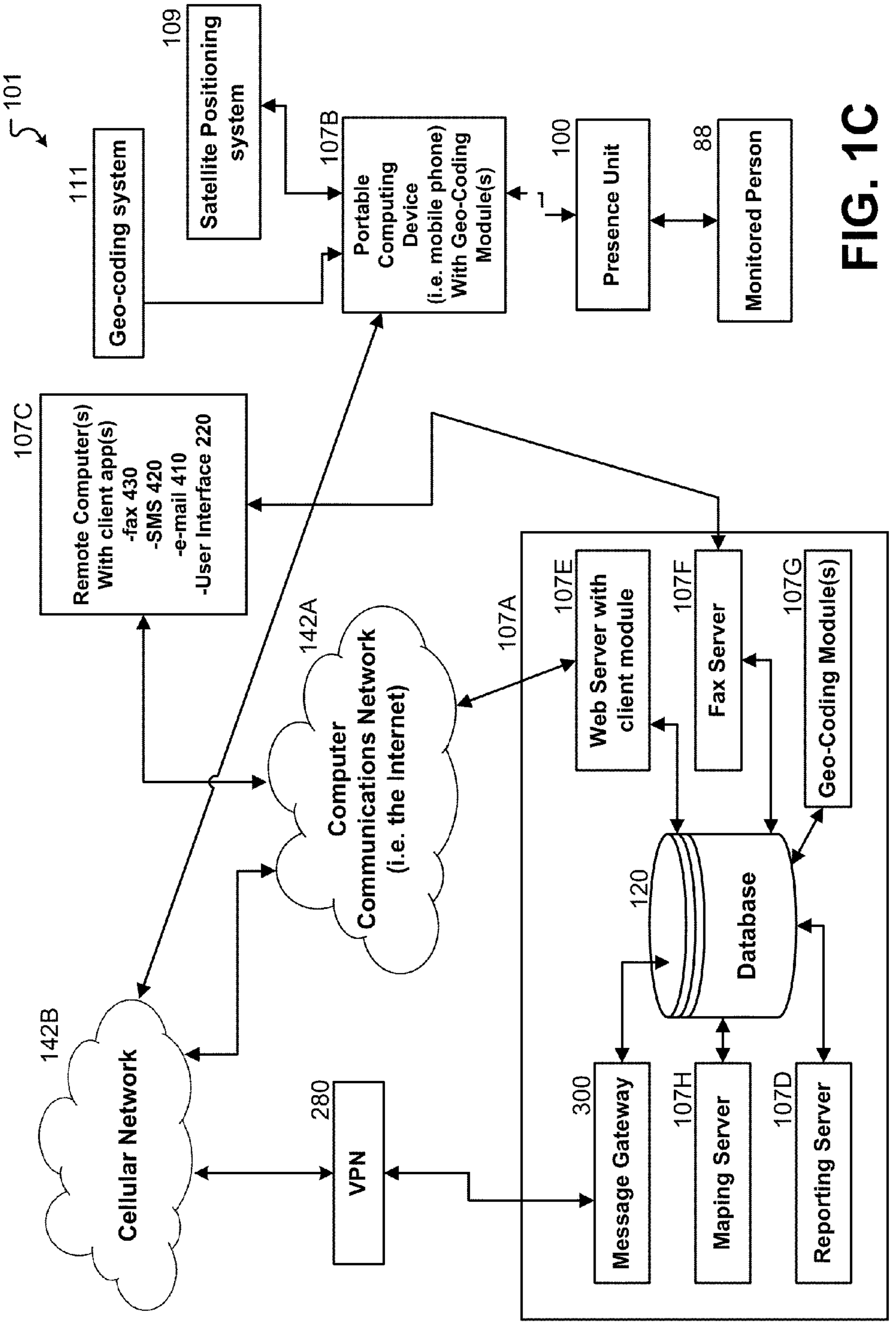
FIG. 1C is a diagram of an exemplary system architecture for implementing an embodiment of the system illustrated in FIG. 1A.

Many of the system elements illustrated in FIG. 1A are coupled via communications links 103 to the communications network 142A and cellular network 142B (see FIG. 1C). The links 103 illustrated in FIG. 1A may comprise wired or wireless couplings or links. Wireless links include, but are not limited to, radio-frequency ("RF") links, infrared links, acoustic links, and other wireless mediums. The communications network 142A may comprise a wide area network ("WAN"), a local area network ("LAN"), the Internet, a Public Switched Telephony Network ("PSTN"), a paging network, or a combination thereof.

The communications network 142 may comprise a cellular telephone network as understood by one of ordinary skill the art. The cellular telephone network which may also be characterized as a mobile phone network may comprise a radio network distributed over land areas, usually called cells. Each cell is served by at least one fixed-location transceiver, known as a cell site or base station. In a cellular network, usually each cell uses a different set of frequencies from neighboring cells to avoid interference and provide guaranteed bandwidth within each cell.

The cellular network that is part of the communications network 142 may include, but is not limited to, the Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN), as well as future generations not yet implemented. The cellular network may form a portion of or it may be part of the communications network 142.

The communications network 142, having the cellular network, may be established by broadcast RF transceiver towers (not illustrated). However, one of ordinary skill in the art recognizes that other types of communication devices besides broadcast RF transceiver towers are included within the scope of this disclosure for establishing the communications network 142 that may include a cellular network.

The OMU/presence unit 100 and portable computing device 107B may have RF antennas so that each element may establish wireless communication links 103 with each other. The portable computing device 107B may also establish links 103 with the communications network 142 via RF transceiver towers (not illustrated). Alternatively, the portable computing device 107B may be directly coupled to the communications network 142 with a wired connection.

The OMU/presence unit 100 may comprise a waterproof enclosure, such as a casing that looks like a watch or timepiece, and that protects a microprocessor or microcontroller 120A (See FIG. 1B) that may be coupled to various onboard sensors. The microprocessor 120A of the presence unit 100 may send wireless messages to the portable computing device 107B. The microprocessor 120A may transmit these messages to the portable computing device 107B using a protocol that has one or more authentication techniques and/or one or more encryption techniques as understood by one of ordinary skill in the art.

For example, any one of standard (and/or non-standard) encryption techniques such as RSA 128 bit may be employed for encrypting messages that are exchanged between the presence unit 100 and the portable computing device 107B. In addition to encryption techniques, the microprocessor 120A and the portable computing device 107B may exchange messages utilizing a wireless protocol as understood by one of ordinary skill in the art, such as, but not limited to, the BLUETOOTH™ wireless protocol. The presence unit 100 and computing device 107B may communicate over any number of different wireless mediums such as, but not limited to, radio-frequency ("RF") links like Near Field Communication ("NFC") links; infrared links; acoustic links; and other wireless mediums.

According to one exemplary embodiment, the portable computing device 107B upon receiving any data from the presence unit/OMU 100 immediately relays the data to the computer monitoring system 107A. The portable computing device 107B and/or its corresponding software for communicating with OMU/presence unit 100 may be designed to not store any of the data received from the OMU/presence unit 100 so that the portable computing device 107B only relays data it receives from the OMU/presence unit 100.

The remote computer 107C running client applications allows the remote computer 107C to communicate with the portable computing device 107B via the computer monitoring system 107A in order to track the OMU 100 and the corresponding monitored person 88. Further details about the client applications that may be executed by remote computers 107C will be described below.

The satellite tracking system 109 may comprise anyone of the existing satellite-based global positioning systems that include, but are not limited to, the U.S.-based GPS, the Russian GLObal NAvigation Satellite System (GLONASS), the European Union Galileo positioning system, the Chinese Compass navigation system, and the Indian Regional Navigational Satellite System. The satellite tracking system 109 may communicate directly with the portable computing device 107B (typically taking the form of a mobile telephone) and/or through the communications network 142. The satellite tracking system 109 may emit signals that are received and relayed by the portable computing device 107B to the communications network 142.

Similar to the satellite tracking system 109, a geo-coding system 111 may communicate directly with the portable computing device 107B. The geo-coding system 111 may take on many different types of hardware and/or software. The geo-coding system 111 may comprise an indoor tracking system that emits a wireless signal (such as a BLUETOOTH™ signal) that is intended for the portable computing device 107B, such as a mobile phone. This wireless signal may comprise a geocode or "tag" that identifies the longitudinal and latitude coordinates for the indoor space that contains the geo-coding system 111.

Such geocoded wireless signals from geo-coding systems 111, as of this writing, are usually designed for generating target advertising associated with the portable computing device 107B. A message module 205 (See FIG. 2B) of the portable computing device 107B may receive, track, and extract such geocoded wireless signals and relay them to the server 107 with a geocode/tag module 215.

The geocoded wireless signals from geo-coding systems 111 may be very helpful when GPS signals from satellites are blocked by structures such as buildings and/or other objects, such as trees, high mountains, etc. The geocoded wireless signals from geo-encoding systems 111 allow an operator of the system 101 to accurately track the movements of an offender when they are traveling indoors such as in a building, that could include a shopping mall, a department store, and other similar structures which may be vast in size and which may block signals that are transmitted from satellites of the satellite tracking systems 109.

In other exemplary embodiments, the geo-coding system 111 may comprise a local area network or "WIFI" network which also has some form of geocode in its service set identifier ("SSID") as understood by one of ordinary skill in the art. In addition to the geocode generated by the geo-coding system 111 within an indoor space, such geo-coding systems 111 may also provide identifiers which indicate the type of business or owners of the indoor space. The server 107A may crosscheck information relayed from the portable computing device 107B with another server 107 or system that may indicate the type of business or owners of the indoor space based on the wireless signals being received by the portable computing device 107B from the systems 111 present within a particular indoor space. For example, the wireless signals emitted by systems 111 within particular indoor spaces may indicate that the portable computing device 107B has entered into a retail establishment which sells alcohol like a package store or a bar associated with entertainment, etc.

This context information becomes important for the server 107A if the goods or services provided within the indoor space have a potential for the offender 88 to violate some provisions of government or court based documents that restrict or limit an offender's actions. For example, if the offender 88 has been identified as an alcoholic on court based documents, then the offender 88 may violate a parole order if he or she enters an establishment which serves alcohol.

FIG. 1B is a functional block diagram of an exemplary offender monitoring unit/presence unit 100 that is part of the system 101 illustrated in FIG. 1A. This OMU 100 may be worn on the offender's person, such as on an extremity like an ankle, wrist, or neck of an offender 88. The offender monitoring unit 100 may have a waterproof housing 99 (See FIG. 5C) with a fastening mechanism. The housing 99 for the OMU 100 may contain various hardware and software elements.

The hardware and software elements within the housing 99 include, but are not limited to, a communication module 105, an antenna 279A, a memory storage unit 110, a microcontroller and/or a central processing unit (CPU) 120A, a charging power supply unit 130A, a rechargeable power source 135 like a battery module, an accelerometer 140, strap light emitting diodes 145A, light emitting diodes 145B, an audio device 150, strap sensors 155, a vibrator 160, a presence switch 165, and a substance (drug and/or alcohol) detector 151.

The microcontroller/CPU 120A may be characterized as the "brain" of the offender monitoring unit/presence unit 100. The microcontroller and/or CPU 120A may comprise a standard ARM processor or it may comprise a standard central processing unit (CPU). The microcontroller 120A issues commands to the communication module 105, the memory storage unit 110, and the cellular telephone network modem (not shown).

The microcontroller 120A may communicate with another microcontroller (not illustrated) that is part of the charging power supply unit 130A. The microcontroller (not illustrated) in the charging power supply unit 130A may control a switch to the rechargeable power comprising a battery and/or capacitor 135 when the charging power supply unit 130A receives a direct current input. This direct current input may originate from a transformer that is plugged into a standard alternating current electrical outlet for providing power to the OMU 100. The direct current may originate from any other power source that is capable of supplying the required DC input voltage and current.

The microcontroller (not illustrated) within the charging power supply unit 130A may turn the rechargeable power source 135, like a battery and/or capacitor, "OFF" or in a low-power state so that it is removed from powering the electronics of the OMU 100 when direct current is received by the charging power supply 130A for recharging the rechargeable power source 135. The rechargeable power source 135 may comprise a battery, a capacitor, or a combination thereof as understood by one of ordinary skill in the art.

The microcontroller 120A may monitor the accelerometer 140 and the strap sensors 155. The accelerometer 140 may provide signals such as movement of the OMU 100 as well as signals for detecting vibration or tampering with the housing 99. The strap sensors 155 may comprise a combination of light emitting diodes, photonic sensors, and fiber optics for detecting changes with an attachment mechanism that may comprise a strap.

One or more fiber optic cables may circumnavigate the attachment mechanism. Light signals are emitted into the fiber optic cables by the strap light emitting diodes 145A and are received with the photonic sensors (not illustrated). If an offender or another person cuts the attachment mechanism, such as a strap, containing the fiber optic cables, then this would disrupt the light signals propagating through the fiber optic cables and trigger an alarm condition which is monitored by the microcontroller 120A and possibly transmitted to computer server 107 via the communication module 105.

The microcontroller 120A may also be coupled to an audio device 150 that may comprise a speaker or a siren. The microcontroller 120A may also be coupled to a vibrator 160 and light emitting diodes (LEDs) 145B that may communicate device conditions to the offender or the operator. The LEDs 145B are not typically used by the operator to communicate to the offender. LEDs 145B may communicate system setup conditions to the operator.

For the offender, the LEDs 145B may communicate battery status and charging status that may be visible to the offender or an operator who programs the OMU 100. The vibrator 160 (and/or the audio device 150) may be used to communicate conditions to the offender wearing the OMU 100. In other words, the microcontroller 120A may also be coupled to an audio device 150 and/or a vibrator 160 and or an array of LEDs 145B which may be used to communicate multiple system conditions to the offender wearing the OMU 100 or to the operator who programs the OMU 100.

The microcontroller 120A may also be coupled to a presence switch 165. The presence switch 165 is not usually accessible to the offender. It is mechanically triggered automatically if the offender removes or attempts to alter the as-installed condition of the device mounted to the offender's appendage. The presence switch 165 is usually not a mechanism for the offender to send a response.

The memory storage unit 110 may comprise flash memory but other types of memory devices may be used without departing from the scope of this disclosure. The memory storage unit 110 may be used by the microcontroller 120A to store past locations of the offender monitoring unit 100. The microcontroller 120A may also store dates and times associated with these locations within the memory storage unit 110.

The memory storage unit 110 may also be used by the microcontroller 120A to store tables that track data associated with a "geo-fence" program module. This geo-fence program module may work with a zone processing module 217 of the PCD 107B as will be described below in connection with FIG. 2B. The microcontroller 120A may execute the geo-fence program module for tracking movement of the offender 88 who is wearing the offender monitoring unit 100.

The geo-fence program module executed by the microcontroller 120A may track at least three different types of zones: an inclusion zone, an exclusion zone, and a neutral zone. The inclusion zone is one in which the microcontroller 120A understands that the offender 88 must be located within this zone or if the offender 88 leaves this zone, then the OMU 100 is required to signal an alert condition back to the server 107A via the portable computing device 107B.

An exclusion zone is one in which the microcontroller 120A understands that the offender 88 may not be located within and it is required to signal an alert condition when the offender 88 enters such a zone. A neutral zone is one in which the microcontroller 120A understands that the offender 88 may enter or leave without signaling any alarm condition. Specifically, a neutral zone is basically set up for monitoring so the microcontroller 120A notes this as a zone of interest where entries and exits will be recorded/communicated but where the entries and exits are not to be acted upon by creation of alarm conditions.

In addition to or in the alternative to using a geo-fence program module, the microcontroller 120A may also work with the remote computer server 107A for tracking "virtual fences" that are established and maintained by the remote computer server 107A. Similar to the geo-fence program module running within the OMU 100, the remote computer server 107A may maintain tables for tracking the location of an offender 88 wearing the OMU 100. If the offender 88 wearing the OMU 100 enters into a geographical region that the offender 88 is excluded from or if the offender 88 leaves a geographical region in which the offender 88 is required to stay within, then the remote computer server 107 may generate an alert signal. The microcontroller 120A is coupled to a base unit communication module 105 that has its own antenna 279A.

Unlike other conventional offender monitoring units (OMUs) 100, the OMU 100 of FIG. 1B does not contain or comprise any GPS hardware and/or software. The absence of GPS hardware and/or software provides the OMU 100 with at least one advantage over the conventional art: power savings. As of this writing, GPS hardware and/or software are very power intensive for a rechargeable device that only uses batteries and/or capacitors. GPS hardware and software may consume significant amounts of power for rechargeable devices like portable computing devices 107B and OMUs 100.

Turning now to FIG. 1C, a high level architecture of an exemplary two-piece system 101 for providing offender management schemes will be described. A central monitoring module, administering various offender management schemes, may reside within computer server 107A. The central monitoring module may be configured to run a predetermined, rules-based algorithm for application of offender management schemes or it may be accessible for adjustment by an administrator via a tracking and monitoring interface rendered by a web server 107E.

Also, generally included in the computer server 107A is a fax server 107F for receiving communications and rendering reports to an operator of the remote computer 107C. A mapping server 107H may also be included in some embodiments and configured to communicate with web server 107E and either internal or third party mapping services for tracking and monitoring the location of a subject offender 88 associated with a given OMU 100. A message gateway 300 may be leveraged to enable the computer server 107A to send and receive communication via a virtual private network ("VPN") 280 and a cellular network 142B with the portable computing device 107B, that typically comprises a mobile phone.

Each of the various components included in a given embodiment of computer server 107A, including a reporting server 107D, may be in communication with a database 120. The database 120 may contain, but is not limited to, records related to individual offender participants including historical tracking data, exclusionary and/or inclusionary rules, monitoring schemes, etc. Computer server 107A may also, in some embodiments, receive data from geo-coding modules 107G that may comprise databases for geocodes. These databases for geocodes may have tables which may translate geocodes received from a signal to longitude and latitude coordinates as understood by one of ordinary skill in the art.

As noted previously, the geocodes from wireless signals of geo-coding systems 111 may be very helpful when GPS signals from satellites are blocked by structures such as buildings and/or other objects, such as trees, high mountains, etc. The geocoded wireless signals from geo-coding systems 111 allow an operator of the system 101 to accurately track the movements of an offender when they are traveling indoors such as in a building, that could include a shopping mall, a department store, and other similar structures which may be vast in size and which may block signals that are transmitted from satellites of the satellite tracking systems 109.

The PCD 107B typically is in constant communication, in many embodiments, with the GPS system 109 (See FIG. 1A) for receiving global coordinates of the OMU 100 and the Geocode systems 111 for receiving geocoded signals containing location data. Such GPS data received from GPS system 109 and/or geocode data may be logged in the PCD 107B and uploaded to computer server 107A at a later date or simply retransmitted to computer server 107A in real-time (depending on mode and monitoring scheme that has been selected on the computer server 107A).

As described above, when the OMU 100 is within a certain proximity the PCD 107B, in some embodiments the OMU 100 may pair with the PCD 107B. The pairing may be accomplished by any number of short distance communication protocols including, but not limited to, WiFi, BLUETOOTH™ or other short wave radio frequency protocols. By communicating with the PCD 107B, it can be deduced that the subject offender 88 associated with OMU 100 is also in proximity with PCD 107B and, consequently, if the PCD 107B conveys appropriate GPS coordinates, then the offender 88 may be in compliance with a given community service program condition.

The administrator operating a remote computer 107C may receive confirmation of actions taken by an offender 88 through user interface 220 by way of email service 410, SMS 420, fax services 430 or the like. Moreover, a third party recipient, such as a law enforcement officer operating a portable computing device 107 (not illustrated) for example, may also be alerted to changes made to monitoring schemes, adjustments in risk profiles, etc.

Figure 1D:
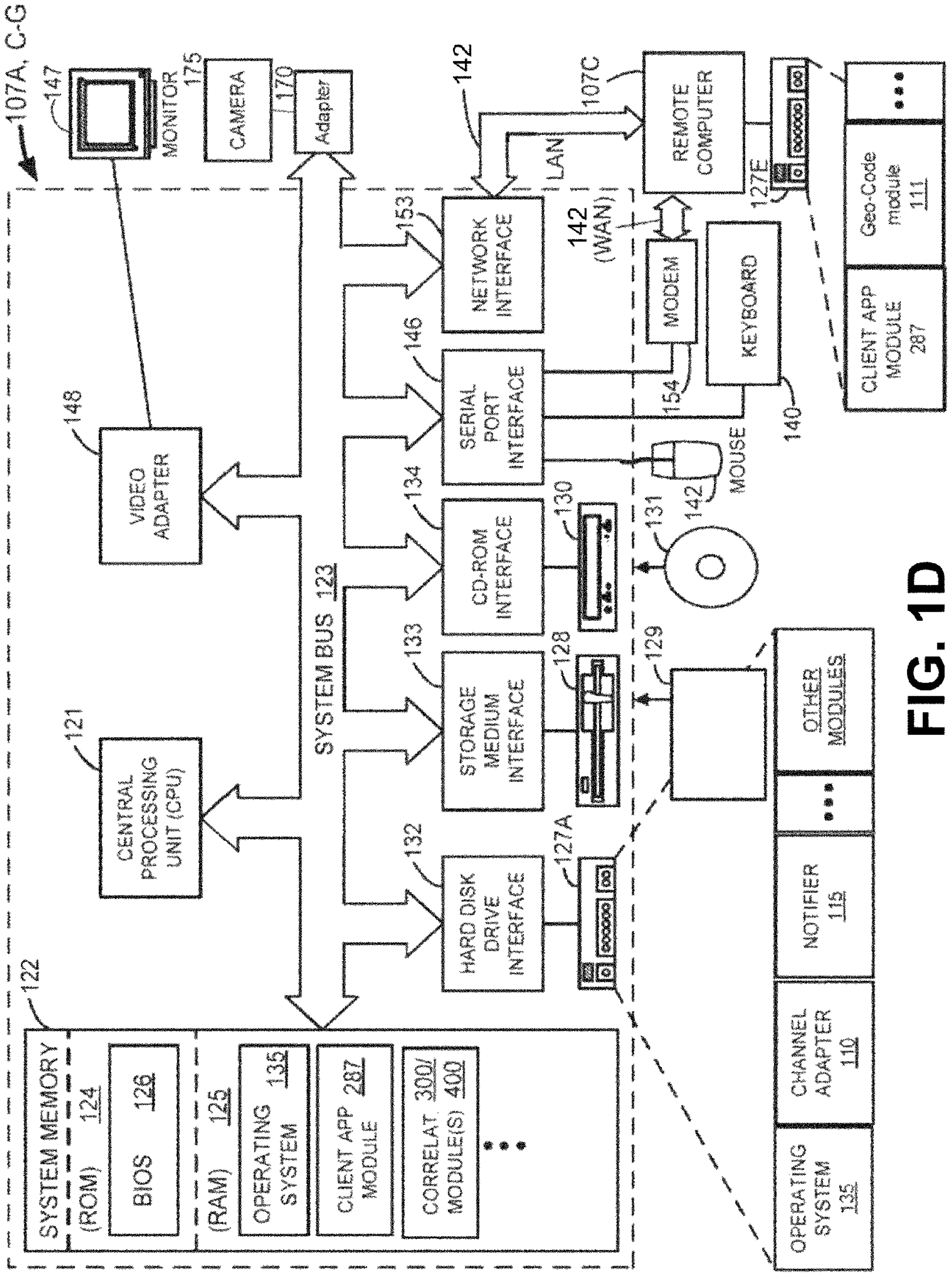
FIG. 1D is functional block diagram of a general purpose computer that may form part of a server illustrated in the system of FIG. 1A.

Referring now to FIG. 1D, this figure is a functional block diagram of a general purpose computer 107 that may form part of or fulfill the role of a server 107A/C-H illustrated in the system of FIGS. 1A-1C. This server 107 may comprise a general-purpose computing device in the form of a conventional computer as understood by one of ordinary skill in the art. Generally, the computer forming a server 107 includes a central processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory 122 includes a read-only memory ("ROM") 124 and a random access memory ("RAM") 125. A basic input/output system ("BIOS") 126, containing the basic routines that help to transfer information between elements within a computer, such as during start-up, is stored in ROM 124.

The computer 107 can include a hard disk drive 127A for reading from and writing to a hard disk, not shown, a USB port 128 for reading from or writing to a removable USB drive 129, and an optical disk drive 130 for reading from or writing to a removable optical disk 131 such as a CD-ROM, a DVD, or other optical media. Hard disk drive 127A, USB drive 129, and optical disk drive 130 are connected to system bus 123 by a hard disk drive interface 132, a USB drive interface 133, and an optical disk drive interface 134, respectively.

Although the environment described herein employs hard disk 127A, removable USB drive 129, and removable optical disk 131, it should be appreciated by one of ordinary skill in the art that other types of computer readable media which can store data that is accessible by a computer, such as magnetic cassettes, flash memory cards, digital video disks, Bernoulli cartridges, RAMs, ROMs, and the like, may also be used in the operating environment without departing from the scope of the system 101. Such uses of other forms of computer readable media besides the hardware illustrated will be used in internet connected devices such as in a portable computing device, like a laptop computer or a handheld computer.

The drives and their associated computer readable media illustrated in FIG. 1D provide nonvolatile storage of computer-executable instructions, data structures, program modules, and other data for computer 107. A number of program modules may be stored on hard disk 127, USB drive 129, optical disk 131, ROM 124, or RAM 137, including, but not limited to, a client application module 287, correlation matrix modules 300/400, and other modules. Program modules may include, but are not limited to, routines, sub-routines, programs, objects, components, data structures, etc., which perform particular tasks or implement particular abstract data types.

A user may enter commands and information into the computer 107 through input devices, such as a keyboard 140 and a pointing device 142. Pointing devices may include a mouse, a trackball, and an electronic pen that can be used in conjunction with an electronic tablet. Other input devices (not shown) may include a joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. As noted above, the display 147 can comprise any type of display devices such as a liquid crystal display (LCD), a plasma display, an organic light-emitting diode (OLED) display, and a cathode ray tube (CRT) display.

A camera 175 may also be connected to system bus 123 via an interface, such as an adapter 170. The camera 175 may comprise a video camera. The camera 175 can be a CCD (charge-coupled device) camera or a CMOS (complementary metal-oxide-semiconductor) camera. In addition to the monitor 147 and camera 175, the client device 107B, comprising a computer, may include other peripheral output devices (not shown), such as a printer.

The computer 107 may also include a microphone (not shown) that is coupled to the system bus 123 via an audio processor (not shown) as understood by one of ordinary skill in the art. The microphone may be used in combination with a voice recognition module in order to process audible commands received from an operator.

The computer forming the server 107A may operate in a networked environment using logical connections to one or more remote computers, such as a web server 107E. A remote computer 107C may be another personal computer, a server, a mobile phone, a router, a networked PC, a peer device, or other common network node. While the web server 107E or a remote computer 107C typically includes many or all of the elements described above relative to the server 107A, only a memory storage device 127E has been illustrated in this FIG. 1D. The logical connections depicted in FIG. 1D include a local area network (LAN) 142 and a wide area network (WAN) 142. Such networking environments are commonplace in offices, enterprise-wide computer networks, intranets, and the Internet.

When used in a LAN networking environment, the computer forming the server 107A is often connected to the local area network 142 through a network interface or adapter 153. When used in a WAN networking environment, the computer 107A typically includes a modem 154 or other means for establishing communications over WAN 142, such as the Internet. Modem 154, which may be internal or external, is connected to system bus 123 via serial port interface 146. In a networked environment, program modules depicted relative to the server 107A, or portions thereof, may be stored in the remote memory storage device 127A. It will be appreciated that the network connections shown are just examples and other means of establishing a communications link between the computers 107 may be used.

Moreover, those skilled in the art will appreciate that the system 101 may be implemented in other computer system configurations, including hand-held devices, multiprocessor systems, microprocessor based or programmable consumer electronics, network personal computers, minicomputers, mainframe computers, and the like. The system 101 may also be practiced in distributed computing environments, where tasks are performed by remote processing devices that are linked through a communications network. In a distributed computing environment, program modules may be located in both local and remote memory storage devices.

Figure 2A:
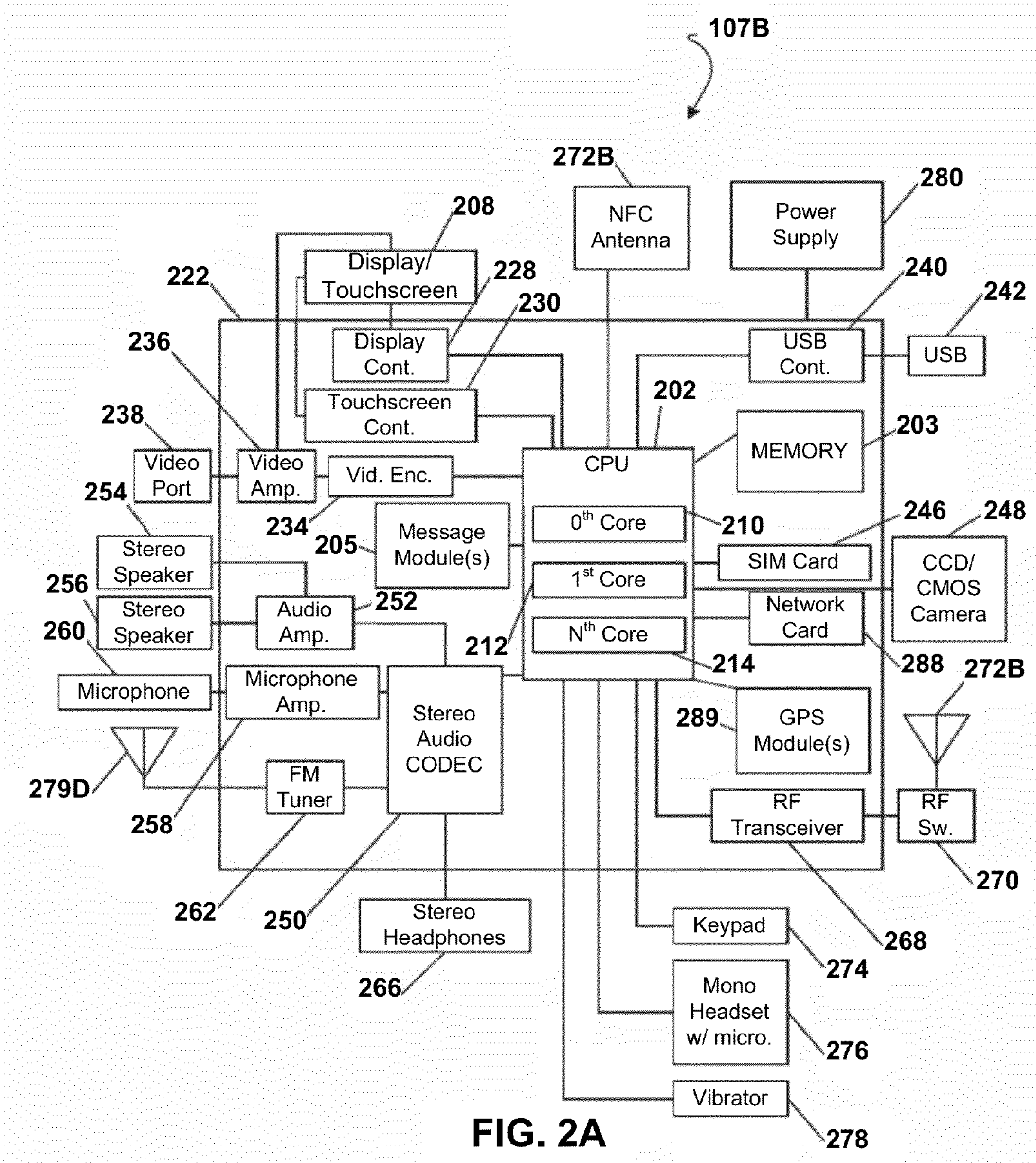
FIG. 2A is functional block diagram of a mobile phone.

Referring now to FIG. 2A, this figure is a functional block diagram of a portable computing device or mobile phone 107B of FIG. 1A which may communicate with the OMU/presence unit 100. The pocket-sized portable computing device ("PCD") may include an on-chip system 222 that includes a multicore CPU 202. The multicore CPU 202 may include a zeroth core 210, a first core 212, and an Nth core 214.

As illustrated in FIG. 2A, a display controller 228 and a touch screen controller 230 are coupled to the multicore CPU 202. In turn, a display/touchscreen 208 external to the on-chip system 222 is coupled to the display controller 228 and the touch screen controller 230. An NFC antenna 272B may be coupled to the CPU 202.

FIG. 2A further shows that a video encoder 234, e.g., a phase alternating line ("PAL") encoder, a séquentiel couleur à mémoire ("SECAM") encoder, or a national television system(s) committee ("NTSC") encoder, is coupled to the multicore CPU 202. Further, a video amplifier 236 is coupled to the video encoder 234 and the touch screen display 208. Also, a video port 238 is coupled to the video amplifier 236. As shown in FIG. 2A, a universal serial bus ("USB") controller 240 is coupled to the multicore CPU 202. Also, a USB port 242 is coupled to the USB controller 240. Memory 203 and a subscriber identity module ("SIM") card 246 may also be coupled to the multicore CPU 202.

Further, as illustrated in FIG. 2A, a camera 248 may be coupled to the multicore CPU 202. In an exemplary aspect, the camera 248 is a charge-coupled device ("CCD") camera or a complementary metal-oxide semiconductor ("CMOS") camera.

As further illustrated in FIG. 2A, a stereo audio coder-decoder ("CODEC") 250 may be coupled to the multicore CPU 202. Moreover, an audio amplifier 252 may coupled to the stereo audio CODEC 250. In an exemplary aspect, a first stereo speaker 254 and a second stereo speaker 256 are coupled to the audio amplifier 252. FIG. 2A also shows that a microphone amplifier 258 may be also coupled to the stereo audio CODEC 250. Additionally, a microphone 260 may be coupled to the microphone amplifier 258. In a particular aspect, a frequency modulation ("FM") radio tuner 262 may be coupled to the stereo audio CODEC 250. Also, a FM antenna 279D is coupled to the FM radio tuner 262. Further, stereo headphones 266 may be coupled to the stereo audio CODEC 250.

FIG. 2A further illustrates that a radio frequency (RF) transceiver 268 may be coupled to the multi core CPU 202. An RF switch 270 may be coupled to the RF transceiver 268 and an RF antenna 272B. As shown in FIG. 2A, a keypad 274 may be coupled to the multi core CPU 202. Also, a mono headset with a microphone 276 may be coupled to the multi core CPU 202. Further, a vibrator device 278 may be coupled to the multi core CPU 202. FIG. 2 also shows that a power supply 280 may be coupled to the on-chip system 222. In a particular aspect, the power supply 280 is a direct current (DC) power supply that provides power to the various components of the PCD 107B that require power. Further, in a particular aspect, the power supply is a rechargeable DC battery and/or capacitor or a DC power supply that is derived from an alternating current (AC) to DC transformer that is connected to an AC power source.

FIG. 2A further shows that the PCD 107B may also include a network card 288 that may be used to access a data network, e.g., a local area network, a personal area network, or any other network. The network card 288 may be a BLUETOOTH™ network card, a WiFi network card, a personal area network (PAN) card, a personal area network ultra-low-power technology ("PeANUT") network card, or any other network card well known in the art. Further, the network card 288 may be incorporated into a chip, i.e., the network card 288 may be a full solution in a chip, and may not be a separate network card 288.

As depicted in FIG. 2A, the display 208, the video port 238, the USB port 242, the camera 248, the first stereo speaker 254, the second stereo speaker 256, the microphone 260, the FM antenna 279D, the stereo headphones 266, the RF switch 270, the RF antenna 272B, the keypad 274, the mono headset 276, the vibrator device 278, NFC antenna 272B, and the power supply 280 are external to the on-chip system 222.

The PCD 107B may comprise a GPS module 289. The GPS module 289 may comprise hardware and/or software and it may be designed to communicate with any of the existing satellite-based global positioning systems. Such global positioning systems include, but are not limited to, the U.S.-based GPS, the Russian GLObal NAvigation Satellite System (GLONASS), the European Union Galileo positioning system, the Chinese Compass navigation system, and the Indian Regional Navigational Satellite System.

In a particular aspect, one or more of the method steps described herein may be stored in the memory 203 of the PCD 107B, as well as in the server 107A, the remote PCDs 107, the OMU 100, and/or other storage devices as computer program instructions. These instructions may be executed by the multicore CPU 202, server 107A, the CPU 120 of the OMU 100, and/or the remote PCDs 107C in order to perform the methods described herein. Further, the multi core CPU 202 of PCD 107B, the CPU/microcontroller 120A of the OMU 100, server 107A, and remote PCDs 107, other storage devices, and memory 203 of the PCD 107B, and memory 110 of the OMU 100 or a combination thereof may serve as a means for executing one or more of the method steps described herein.

Figure 2B:
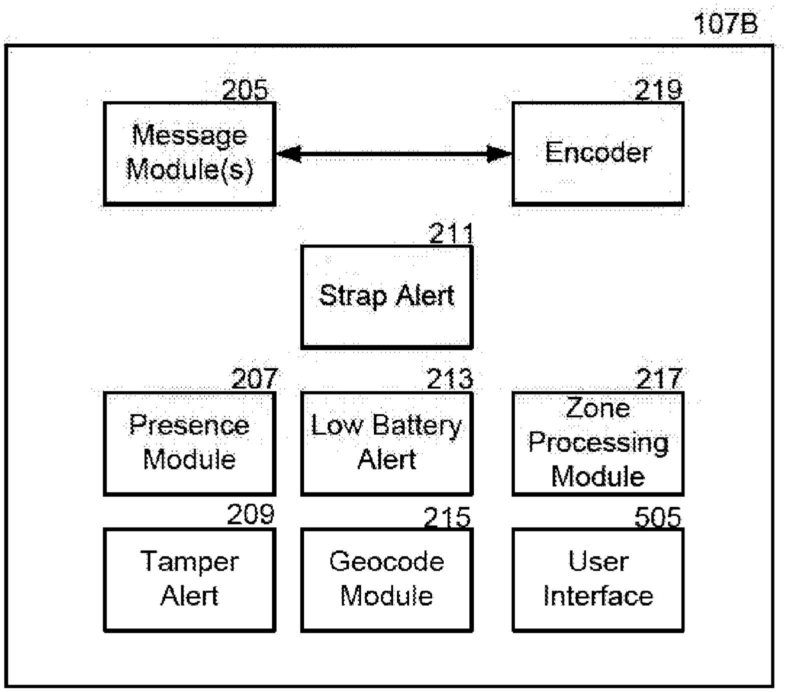
FIG. 2B is functional block diagram of some software modules that may be executed by the mobile phone of FIG. 2A.

Referring now to FIG. 2B, this figure is functional block diagram of some software modules that may be executed by the mobile phone of FIG. 2A and which may be stored in memory 203 and executed by CPU 202. The modules may include, but are not limited to, a message module 205, an encoder module 219, a strap alert module 211, a presence module 207, a low battery alert 213, a zone processing module 217, a housing tamper alert module 209, a geocode module 215, and a user interface module 505.

The encoder module 219 may encode the messages generated by the message module 205. The encoder module 219 may comprise hardware and/or software using a protocol that has one or more authentication techniques and/or one or more encryption techniques as understood by one of ordinary skill in the art. As noted above, for example, any one of standard (and/or non-standard) encryption techniques such as RSA 128 bit may be employed by the encoder module 219 for encrypting messages that are exchanged between the presence unit/OMU 100 and the portable computing device 107B.

In addition to encryption techniques, the encoder 219 may follow a wireless protocol as understood by one of ordinary skill in the art, such as, but not limited to, the BLUETOOTH™ wireless protocol. The presence unit 100 and computing device 107B may communicate over any number of different wireless mediums such as, but not limited to, radio-frequency ("RF") links like Near Field Communication ("NFC") links; infrared links; acoustic links; and other wireless mediums.

The message module 205 may log calls as well as any text generated with a simple messaging system (SMS). The message module 205 may send this log information back to the server 107.

The message module 205 may be responsible for tracking various conditions associated with the presence unit 100. For example, the message module 205 may track signals such as a presence signal produced by the presence module 207, the housing tamper alert signal produced by the housing or tamper alert module 209, a strap tamper alert signal produced by the strap alert module 211, and a low battery signal produced by the low battery alert module 213. The presence module 207 may be coupled to the presence switch 165 described above. Similarly, the strap alert module 211 may be coupled to the strap sensors 155 and the strap LEDs 145A as described above. The low battery alert module 213 may be coupled to the charger power supply 130A.

With respect to the presence module 207, the message module 205 alone or in combination with the presence module 207 may be adaptive/evolving and/or periodic. For example, the message module 205 alone or in combination with the presence module 207 may generate a presence signal ping about every twenty seconds for a minute and then back off to decrease this frequency to about once every minute or about every five minutes. Such a shift in this period may be characterized as adaptive/evolving.

In other situations, the message module 205 alone or in combination with the presence module 207 may generate a presence signal ping periodically for about once every minute or about once every two minutes in which the portable computing device 107B conducts handshake verification with the presence unit 100. The handshake verification may comprise a very simple message that may positively identify the presence unit/OMU 100 by its unique identifier, which may be assigned at the end of manufacturing for the presence unit 100.

The unique identifier of the OMU/presence unit 100 may be mated/coupled/paired to a unique identifier assigned to the portable computing device 107B. The unique identifier assigned to the portable computing device 107B may comprise the international mobile equipment identity (IEMI) under the GSM standard or the identifier used under CDMA. The message module 205 of the portable computing device 107B may then relay the unique identifier of the presence unit/OMU 100 and the unique identifier of the portable computing device 107B back to the server 107A.

Messages from the portable computing device 107B may comprise encrypted Internet protocol messages that are sent over the cellular telephone network 142 and then over the Internet 142 to the server 107B. Communications between the portable computing device 107B and the server 107A may be randomly set in order to conserve power while also preventing an offender 88 from determining the frequency and/or duration of these messages that are exchanged between these two system elements. The server 107A may "push" data or "ping" the portable computing device 107B at any time in order to retrieve information such as current location and if the presence unit 100 is within range of the portable computing device 107B.

The server 107A may collect the data from the presence unit/OMU 100 and the portable computing device 107B in order to determine a status of the offender (i.e. is the offender working or not working, and the location of the offender relative to those contexts) and an intent (what action an offender might take given his current location and context). The location of the portable computing device 107B may be calculated by a satellite positioning system which is already part of the portable computing device 107B, such as with the GPS module 289 (See FIG. 2A), or a location of the portable computing device 107B may be triangulated if the portable computing device 107B operates within a CDMA as understood by one of ordinary skill in the art.

The geocode module 215 may work with the geo-coding system 111 described above. It may comprise software and/or hardware which decipher(s) signals from indoor geo-coding systems 111 which emit a wireless signal (such as a BLUETOOTH™ signal) that is intended for the portable computing device 107B, such as a mobile phone. As mentioned previously, this wireless signal may comprise a geocode or "tag" that identifies the longitudinal and latitude coordinates for the indoor space that contains the geo-coding system 111.

Such geocoded wireless signals from geo-coding systems 111, as of this writing, are usually designed for generating target advertising associated with the portable computing device 107B. The message 205 alone or in combination with the geocode module 215 of the portable computing device 107B may receive, track, and extract such geocoded wireless signals and relay them to the server 107A.

In other exemplary embodiments, the geo-coding system 111 may comprise a local area network or "WIFI" network which also has some form of geocode in its service set identifier ("SSID") as understood by one of ordinary skill the art. In addition to the geocode generated by the geo-coding system 111 within an indoor space, such geo-coding systems 111 may also provide identifiers which indicate the type of business or owners of the indoor space.

The server 107A, after receiving the geocode message from the PCD 107B via the geocode module 215, may cross-check this information with another server 107 or system that may indicate the type of business or owners of the indoor space based on the wireless signals being received by the portable computing device 107B from the systems 111 present within a particular indoor space. For example, the wireless signals emitted by systems 111 within particular indoor spaces may indicate that the portable computing device 107B has entered into a retail establishment which sells alcohol like a package store or a bar associated with entertainment, etc.

The zone processing module 217 of the PCD 107B may work with the geo-fence program module executed by the micro controller 120A of the OMU 100. The zone processing module 217 alone or in combination with the geo-fence program module of the OMU 100 may track the at least three different types of zones described above which include an inclusion zone, an exclusion zone, and a neutral zone. In some exemplary embodiments of the system 101 in which it is desired that the OMU 100 have as simple software and/or hardware as possible, the zone processing module 217 of the PCD 107B may completely track the three different zones described above such that the OMU 100 does not have any geo-fence program modules/geo-fence functionality as understood by one of ordinary skill in the art.

Figures 5A, 5B:
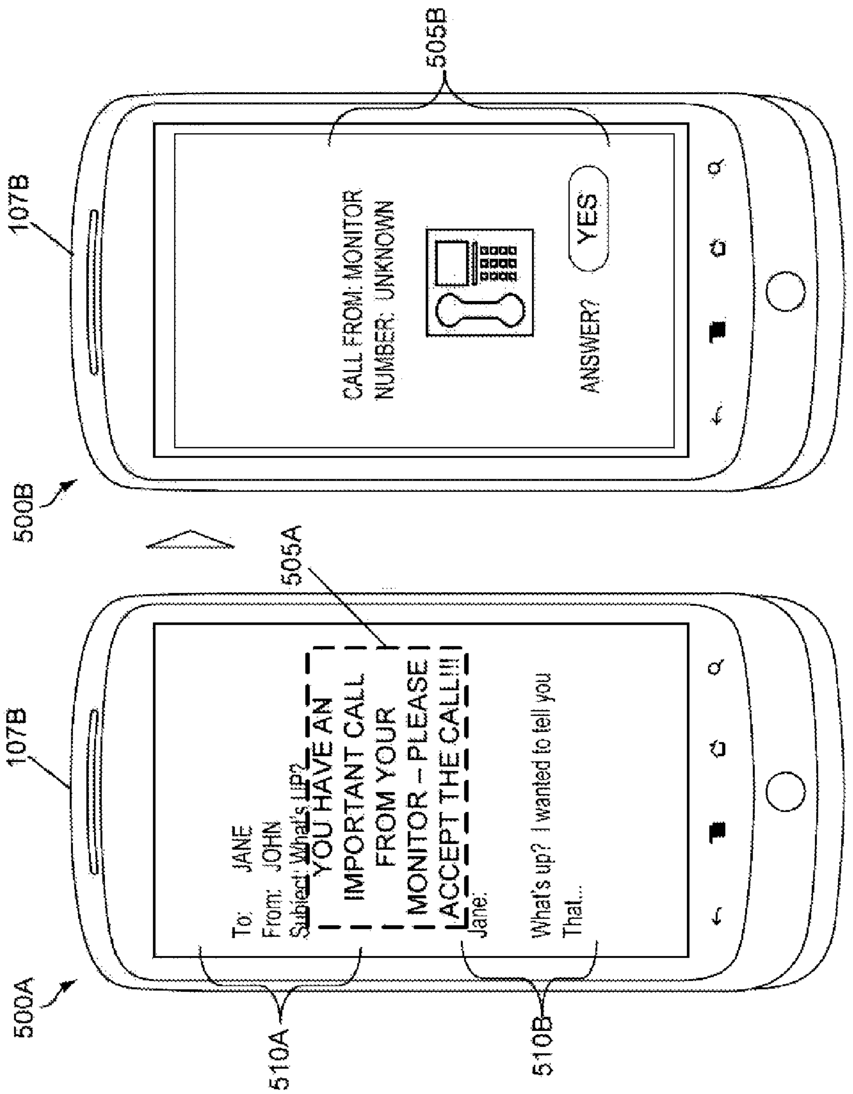
FIG. 5A illustrates a graphical user interface that illustrates how regular operations of the mobile phone may be interrupted according to one exemplary embodiment.
FIG. 5B illustrates a graphical user interface corresponding to the graphical user interface of FIG. 5A that illustrates how regular operations of the mobile phone may be interrupted according to one exemplary embodiment.
Figure 5C:
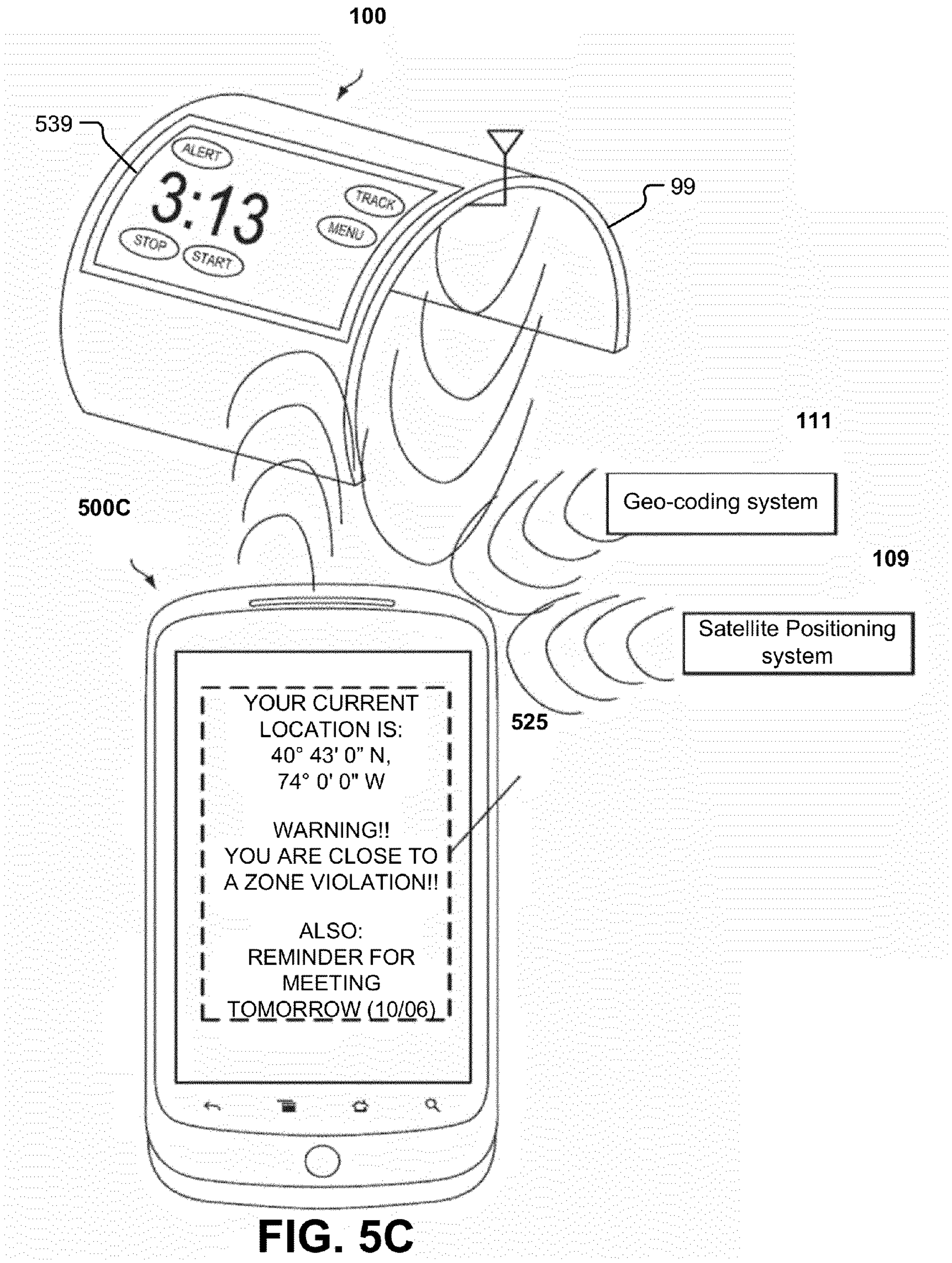
FIG. 5C illustrates some of the key components of the two-piece system according to one exemplary embodiment.

The user interface module 505 may manage any one of several interfaces that may be presented on the PCD 107B for managing the function and operation of the presence unit/OMU unit 100. Exemplary user interfaces are illustrated in FIGS. 5A-5C described below. The user interface module 505 may interrupt regular processing of any application running on the PCD 107B so that a user interface for managing the presence unit/OMU unit 100 may be displayed and may receive input from an operator of the PCD 107B.

For example, if a phone call is being made from an officer or manager responsible for the offender 88, then the user interface module 505 may interrupt and suspend any operation of an application program running on the PCD 107B so that the offender 88 may receive the call with the PCD 107B. This allows an operator of the system 101 to communicate with the offender 88 who wears the presence unit 100 that is coupled to the portable computing device 107B.

When the system 101 generates an alert based on the data contained within the correlation matrix 300, an operator of the system 101 may communicate with the offender 88 via the user interface 505. The user interface may support alphanumeric text messages and the like so that the operator of the system 101 may communicate with the offender 88 via the portable computing device 107B. The user interface 505 may support SMS messages as well as e-mails as well as any other similar electronic messages as understood by one of ordinary skill in the art. Further details on this example are described below in connection with FIGS. 5A-5B.

Referring now to FIG. 3, this figure is a diagram of a correlation matrix 300 which may be produced by the server 107A of FIGS. 1A and 1D. The server 107A tracks all of the data relayed to it from the portable computing device 107B. This data may comprise GPS data, geocode data, as well as alert/alarm data from the OMU's sensors and geo-fence data. The server 107A may conduct adaptive verification for the offender 88 wearing the presence unit/OMU 100. The server 107A may correlate all this information in order to accurately track and predict actions of offenders.

Specifically, the server 107A may generate a correlation matrix 300 that is weighted based on certain criteria as will be described in further detail below. The weighting against values within the matrix 300 as well as the information contained within the correlation matrix may change over time. This change in weighting and the information over time is associated with the "adaptive" nature of this offender verification.

In the exemplary embodiment illustrated in FIG. 3, the correlation matrix 300 may track one or more various offender monitoring parameters. These exemplary parameters may include, but are not limited to, last voice communications established with the offender 305, the last location tracked 310, an offender's work history 315, and an offender's possible treatment 320.

Each of these offender monitoring parameters may be tracked over time. In the exemplary embodiment illustrated in FIG. 3, these parameters have been tracked at time T1 and at time T2. Each parameter may be assigned a weighted percentage based on a history of records kept for a particular parameter and for a particular offender 88.

For example, the last voice communications parameter 305 may track the number of times and/or how recent an offender has been contacted by the operator of the system 100 over the telephone. As the weight percentage increases, in this particular exemplary embodiment, this may indicate the parameter's importance relative to the other parameters being tracked.

So when the exemplary embodiment illustrated in FIG. 3, at time T1, the weight percentage for the last voice communication parameter 305 is at 60% while at time T2 the weight percentage for this parameter has decreased down to 30%. Such a decrease may be attributed to an operator using a remote computer 107C and reaching an offender 88 over the telephone between time T1 and time T2, in which time, this telephone call is then logged at time T2 and impacting the weight percentage by lowering it down to the 30% value illustrated.

Similarly, for the location tracked parameter 310 which has a relative weight percentage of 20% at time T1 and which later increases to 50% of time T2. This increase in weight percentage for the location tracked parameter 310 may correspond with the offender entering or exiting an improper zone and/or if the system 100 lost communication with the portable computing device 107B after several requests made from the server 107 were not answered by the presence unit/OMU 100.

With respect to the status of the offender at time T1, the magnitude of the relative weight percentage of any given parameter may trigger an action required from the operator of the system 100. For example, for any parameter being tracked which has a magnitude greater than 50%, such a magnitude may be coupled or associated with an action that is required from an operator.

The correlation matrix 300 of FIG. 3 may be associated with a status monitoring table and/or system 400 as illustrated in FIG. 4. Each offender may be rated with one or more categories of status in which each category may also be associated with an action that should be taken by an operator the system 101.

Referring now to FIG. 4, this figure is a diagram of a color coding system used in the correlation matrix of FIG. 3. The status monitoring system 400 may comprise three color coded levels: red level 405, yellow level 410, and green level 415. The red level 405 may require immediate and direct action from an operator the system 100. For example, the red level 405 may require an operator to call an offender 88. This red level 405 may correspond with the relative weight percentage of 60% at time T1 in the correlation matrix 300 of FIG. 3. In other words, with the 60% value for the last voice communication parameter 305 in the correlation matrix 300, then the system 101 may assign the offender with the red status level 405 in the status monitoring system 400.

At time T2, the offender may be downgraded from the red level status 405 to the yellow status level 410 because the last voice communication parameter 305 changed from 60% at time T1 to 30% at time T2 while the location tracked parameter 310 increased from 20% at time T1 to 50% at time T2. The yellow status level 410 may require an action of the operator to send a text message to the portable computing device 103 in order to verify that a text message will be received from the offender 88.

Other values and types of parameters, weight percentages, and status levels for the correlation matrix 300 and the status levels of the status monitoring system 400 are possible and are included within the scope of this disclosure. For example, the red status level 405 may require other actions besides calling an offender, such as requiring a drug test from the offender which may correspond to the treatment parameter 320 of the correlation matrix 300. Similarly, the yellow status level 410 may also be associated with a different action besides sending a text message.

For example, the yellow status level 410 of the system 400 at another time T3 (not illustrated) could comprise an action requiring an operator to send a request for an operational status of the presence unit 100, etc. The status monitoring system 400 instead of using color coded levels may use numeric coded levels such as values between the numbers 1 and 10.

FIG. 5A illustrates a graphical user interface 500A that illustrates how regular operations of the portable computing device (i.e. mobile phone) 107B may be interrupted according to one exemplary embodiment. The user interface module 505 which produces the interface 500A of FIG. 5A and the corresponding message module 205 may have priority over all other applications running on the portable computing device 107B.

In other words, the user interface 505 and message module 205 may dominate or have the highest level of priority to respect to any processing of other applications by the portable computing device 107B. Further, the user interface 505 and the message module 205 may be allowed to interrupt any other application running on the portable computing device 107B. This means that if the offender 88 was running another application program, such as gaming software, the user interface 505 and/or the message module 205 may interrupt the gaming software in order to relay any messages that have been sent from the server 107A, such as by an operator wishing to remind the offender of an important counseling date and/or the operator of the system 101 advising the offender 88 that he/she may be committing a geo-fence zone violation (See FIG. 5C).

In the exemplary embodiment illustrated in FIG. 5A, an offender 88 was in the middle of a e-mail application in which the offender 88 was composing an e-mail that had address information 510A and message body content 510B. The user interface module 505 produced the screen message 505A that alerts the offender 88 that he or she has an important call from an operator of the system 101.

FIG. 5B illustrates a graphical user interface 500B corresponding to the graphical user interface of FIG. 5A that illustrates how regular operations of the portable computing device (i.e. mobile phone) 107B may be interrupted according to one exemplary embodiment. This exemplary embodiment a second message 505B with call controls is displayed by the user interface module 505. In the specific embodiment illustrated, the call controls allow the offender 88 to accept the incoming call originating from an operator of the system 101.

FIG. 5C illustrates some of the key components of the two-piece system according to one exemplary embodiment as well as some exemplary data corresponding to the graphical user interfaces 500A, B of FIGS. 5A and 5B. This figure illustrates how the presence unit/OMU 100 having a housing 99 may communicate with the PCD 107B. This figure also illustrates how the PCD 107B may be in constant communication with the satellite tracking system 109 and the geocoding system 111.

FIG. 5C further illustrates a message 525 that may be produced by the user interface module 505 and/or the message module 205. The message 525 may comprise longitudinal and latitude coordinates that were determined by the PCD 107B and it may contain information from the operator of the system 101 that is advising the offender 88 that he or she is getting close to a zone violation and also remind the offender 88 that there is a meeting that must be attended by the offender 88 on the next day.

FIG. 5C illustrates one perspective view of one exemplary embodiment of a housing 99 and corresponding appendage fastening mechanism for an offender monitoring unit 100. The housing 99 has been illustrated having a size and shape like a standard wrist watch or time piece. However, the housing 99 may take on other shapes or designs as understood by one of ordinary skill in the art. As the electronics contained by the housing 99 become smaller and the electronic packaging schemes more compact, the housing 99 may be reduced in size by several form factors. As exemplary embodiments, housing 99 may take on the form such that the housing 99 looks like a standard smaller devices such as pin, necklace, bracelet, or the like.

The housing 99 may also provide a region or area on a display 539 for the LEDs 145 described above in connection with FIG. 1B. A fastening mechanism for the housing may comprise a strap or other type of mechanical fastener as understood by one of ordinary skill in the art.

According to one exemplary embodiment as described above in connection with FIG. 1B, the fastening mechanism for the housing 99 may include or comprise optical fibers (not shown) that work in conjunction with a-strap sensors 155 described above. The strap sensors 155 may detect if there is any tampering or altering of the fastening mechanism. While the fastening mechanism has been illustrated to have a width that is substantially similar to the width of the housing 99, one of ordinary skill the art will recognize that the fastening mechanism may also comprise a sleeker design when the housing 99 has a reduced form factor necklace or bracelet.

Figure 6:
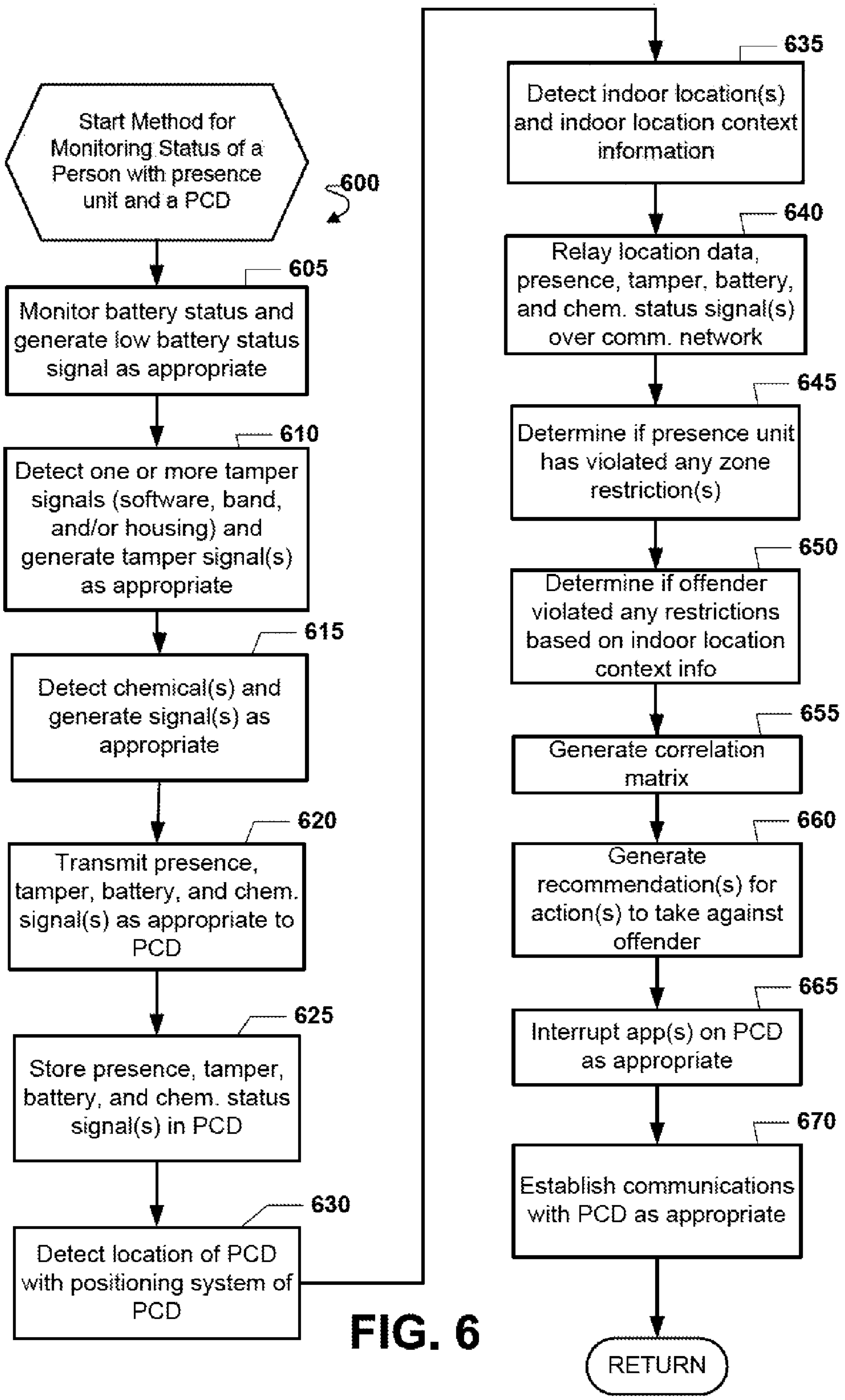
FIG. 6 is a logical flowchart illustrating a method for monitoring status of a person having a presence unit and a portable computing device according to one exemplary embodiment.

FIG. 6 is a logical flowchart illustrating a method 600 for monitoring status of a person 88 having a presence unit 100 and a portable computing device 107B according to one exemplary embodiment. Block 605 is the first step of method 600. At block 605, the microcontroller/CPU 120A of the OMU 100 may check with its charger power supply 130A periodically in order to determine the status of the rechargeable power source 135 which may comprise a battery and/or capacitor. The CPU 120A may then relayed messages about the status to the PCD 107B.

Next, in block 610, the OMU 100 may detect one or more tamper signals and generate tamper messages as appropriate which are relayed to the PCD 107B. The OMU 100 may constantly monitor its strap sensors 155, strap LEDs 145, as well as the accelerometer 140 to determine if an offender 88 is compromising the OMU 100 in some fashion.

In block 615, the OMU 100 may detect chemicals associated with the offender 88 using the drug/alcohol detector sensors 151 as described above. At block 620, the OMU 100 may transmit the presence, tamper, battery, and chemical status information as appropriate to the PCD 107B. The OMU 100 may transmit this information periodically and/or in response to pings made by the PCD 107B. As described above, the communications between the OMU 100 and PCD 107B may be encrypted as described above in connection with the encoder 219 housed in the PCD 107B. The OMU 100 may also include a corresponding encoder (not illustrated).

In block 625, the PCD 107B may receive and store the information transmitted from the OMU 100 which may include the presence status of the OMU 100, tamper status, battery status, and chemical status signals as described above. In block 630, the PCD 107B may detect the location of the PCD 107B using its positioning system that may work with a satellite positioning system 109 and/or the triangulation of cellular phone towers as understood by one of ordinary skill the art.

Next, in block 635, the PCD 107B may detect indoor locations and indoor context information from geocoded signals originating from geo-coding systems 111 described above. The PCD 107B may determine its location (geographical coordinates) from the geocoded signals and/or it may relay the geocoded signals to the server 107A for subsequent decoding to obtain indoor location information. Next, in block 640, the PCD 107B may relay the location data, presence data, tamper data, battery data, and chemical status data over the communications network 142, which usually includes a cellular telephone network, in order to reach the server 107A.

In block 645, the server 107A and/or PCD 107B may determine if the presence unit/OMU 100 has violated any zone restrictions as described above. Such zones may include, but are not limited to, an inclusion zone, an exclusion zone, and a neutral zone. The server 107A alone or the PCD 107B alone, or these two devices in combination may determine if the OMU 100 has violated any one of the aforementioned zones established for an offender 88.

Similarly, in block 650, the server 107A and/or PCD 107B may determine if the presence unit/OMU 100 has violated any indoor location context information. That is, the server 107A alone or the PCD 107B alone, or these two devices in combination may determine if the OMU 100 has violated indoor restrictions such as those applicable to certain types of establishments/businesses. For example, if an offender 88 was restricted from consuming alcohol, and any establishment/business serving alcohol or selling alcohol may constitute a violation of an indoor location restriction.

Next, in block 655, the server 107A may generate an adaptive correlation matrix 300 as described above in connection with FIG. 3. As described above, the correlation matrix 300 may comprise weighted information on offender verifications based on certain criteria. The weighting against values within the matrix 300 as well as the information contained within the correlation matrix may change over time. This change in weighting and the information over time is associated with the "adaptive" nature of this offender verification.

Next, in block 660, the server 107A may generate one or more recommendation(s) for action(s) to take against an offender 88. Such actions may include, but are not limited to, placing a telephone call to the offender 88 and sending a text based message to the offender 88.

Subsequently, in block 665, the user interface module 505 may receive one or more messages over the communications network 142 from the computer server 107A that cause the user interface module 505 to interrupt one or more applications that may be running on the PCD 107B, such as illustrated in FIG. 5C. In block 670, the computer server 107A may establish communications with the PCD 107B as appropriate. Such communications may include, but are not limited to, a cellular telephone call, a voice over Internet protocol (VOIP) call, an e-mail, a text message, a video chat, and other like communications as understood by one of ordinary skill in the art.

Figure 7:
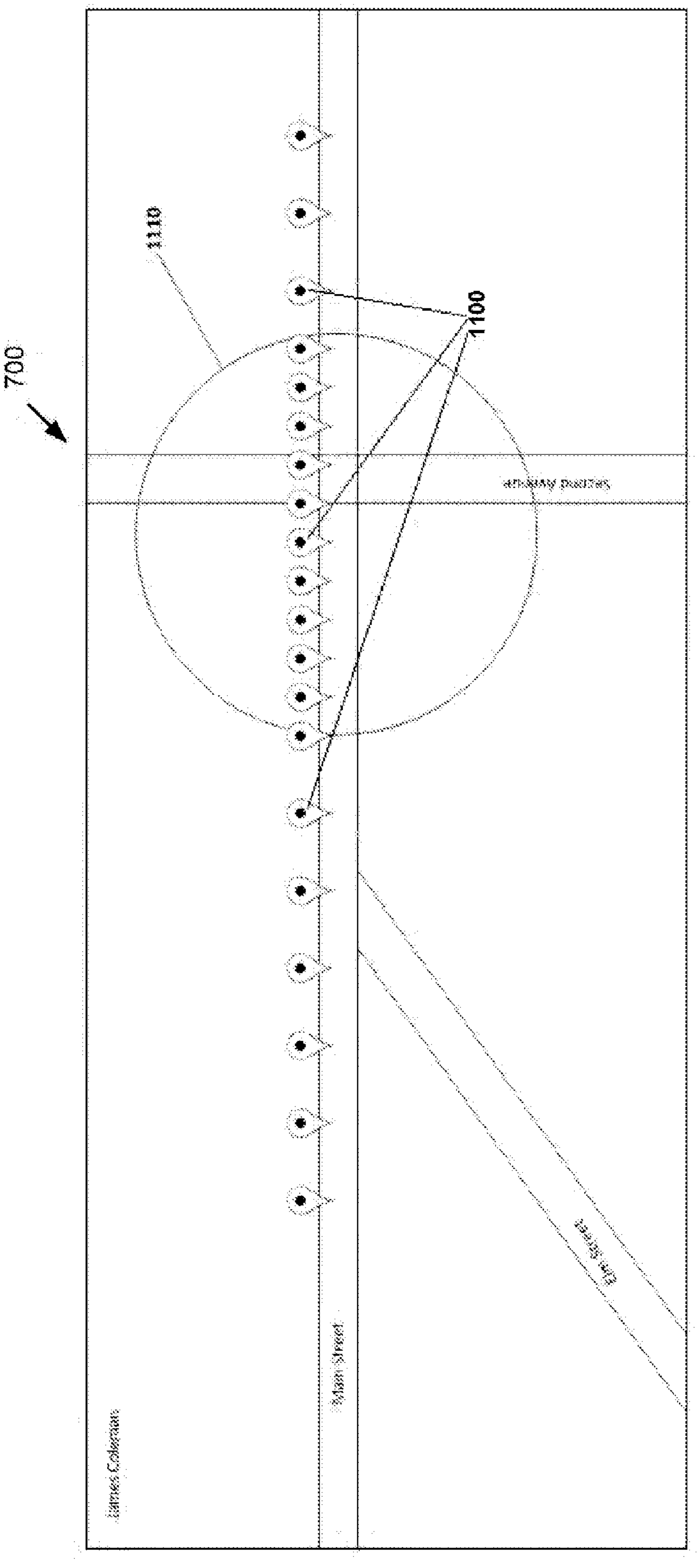
FIG. 7 illustrates a graphical user interface for mapping locations of one or more offenders according to one exemplary embodiment.

FIG. 7 illustrates a graphical user interface 700 for mapping locations of one or more offenders 88 according to one exemplary embodiment. A series of flags 1100 representing GPS data points taken by an OMU 100 as an offender 88 moves through a geographic area are depicted. Notably, when the offender 88 entered an exclusion zone 1110, the frequency of the data points collected was increased compared to the number of data points taken outside of the exclusion zone 1110. This graphical user interface 700 may be generated by the server 107A and it may be transmitted to one or more remote computers 107C over the computer communications network 142 for display on display devices 147.

Systems, devices and methods for the electronic management of offenders based on real-time risk profiles have been described using detailed descriptions of embodiments thereof that are provided by way of example and are not intended to limit the scope of the disclosure. The described embodiments comprise different features, not all of which are required in all embodiments of a system and method for electronic management of offenders based on real-time risk profiles. Some embodiments of a system and method for electronic management of offenders based on real-time risk profiles utilize only some of the features or possible combinations of the features. Variations of embodiments of a system and method for electronic management of offenders based on real-time risk profiles that are described and embodiments of a system and method for electronic management of offenders based on real-time risk profiles comprising different combinations of features noted in the described embodiments will occur to one of ordinary skill in the art.

Further, certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or parallel (substantially simultaneously with) other steps without departing from the scope and spirit of the invention. In some instances, certain steps may be omitted or not performed without departing from the invention. Further, words such as "thereafter," "then," "next," etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Although selected aspects have been illustrated and described in detail, it will be understood that various substitutions and alterations may be made therein without departing from the spirit and scope of the present invention, as defined by the following claims.

What is claimed is:

1. A computer implemented method for monitoring an offender comprising: establishing a communications link between a mobile phone and an offender monitoring unit; receiving geocoded signals generated by a geo-coding system from any location within an indoor space with the mobile phone, wherein the geocoded signals provide indoor location information; establishing a communications link between the mobile phone and a computer server; relaying the geocoded signals from the mobile phone to the computer server; and generating a correlation matrix that tracks a plurality of offender monitoring parameters associated with the offender monitoring unit over time and provides one or more recommendations on how to manage the offender based on the changes in the plurality of offender monitoring parameters at different points in time.

2. The method of claim 1, further comprising detecting with the offender monitoring unit if the offender monitoring unit has been compromised.

3. The method of claim 1, further comprising detecting at least one of a tampering signal, battery status signal, and chemical sensing signal with the offender monitoring unit.

4. The method of claim 3, further comprising relaying status information from one or more signals from the offender monitoring unit to the mobile phone.

5. The method of claim 4, further comprising relaying the status information from the mobile phone to the computer server over a communications network.

6. The method of claim 1, further comprising determining if the offender monitoring unit has violated one or more zone restrictions.

7. The method of claim 6, wherein the one or more zone restrictions comprise at least one of a restriction zone, an inclusion zone, and a neutral zone.

8. The method of claim 6, further comprising determining if the offender has violated any restriction based on the received indoor location information.

9. The method of claim 1, wherein the offender monitoring unit does not have any global positioning service (GPS) software or hardware.

10. An offender monitoring system comprising: a computer server for tracking and recording times and locations associated with an offender monitoring unit; a portable computing device that communicates with the computer server over a wireless telephone network, the portable computing device comprising a global satellite positioning module for ascertaining a geographical location of the portable computing device and a geocode module for receiving geocoded signals generated by a geo-coding system from any location within an indoor space, wherein the geocoded signals comprise location information for one or more indoor locations, the portable computing device being associated with only a single offender monitoring unit; and the offender monitoring unit being coupled to the portable computing device via a wireless communication channel, the offender monitoring unit operating without any global satellite positioning software or hardware, wherein the computer server generates a correlation matrix that tracks a plurality of offender monitoring parameters associated with the offender monitoring unit over time, and provides on or more recommendations on how to manage the offender based on the changes in the plurality of offender monitoring parameters at different points in time.

11. The system of claim 10, wherein the portable computing device comprises at least one of a mobile telephone, a personal digital assistant, a pager, a smartphone, a navigation device, and a hand-held computer with a wireless connection or link.

12. The system of claim 10, wherein the offender monitoring unit is worn on a limb of a human body.

13. The system of claim 10, wherein the computer server determines if the offender monitoring unit has violated one or more zone restrictions.

14. The system of claim 13, wherein the one or more zone restrictions comprise at least one of a restriction zone, an inclusion zone, and a neutral zone.

15. The system of claim 10, wherein the computer server determines if the offender has violated any restriction based on the received indoor location information.

16. A computer implemented system for tracking an offender comprising: an offender monitoring unit running a communication module for establishing a communications link between a mobile phone and the offender monitoring unit; a geo-coding system, wherein a geocode module running in the mobile phone receives geocoded signals generated by the geo-coding system from any location within an indoor space with the mobile phone, wherein the geocoded signals provide indoor location information; a network interface in the mobile phone for establishing a communication link between the mobile phone and a computer server, wherein a message module in the mobile phone relays the geocoded signals from the mobile phone to the computer server; and a correlation matrix generated by a correlation matrix module running in the computer server, wherein the correlation matrix tracks a plurality of offender monitoring parameters associated with the offender monitoring unit over time, and provides one or more recommendations on how to manage the offender based on the changes in the plurality of offender monitoring parameters at specific points in time.

17. The system of claim 16, further comprising a tamper alert module running in the offender monitoring unit for detecting if the offender monitoring unit has been compromised.

18. The system of claim 16, wherein the message module detects at least one of a tampering signal, a battery status signal, and a chemical sensing signal.

19. The system of claim 16, wherein the communications module relays status information from one or more signals from the offender monitoring unit to the mobile phone.

* * * * *